Nov. 22, 1938.  S. B. TERRY  2,137,368
CONTINUOUS GAUGE
Filed Aug. 1, 1936  2 Sheets-Sheet 1

INVENTOR
Spencer B. Terry,
BY
Joseph K. Schofield
ATTORNEY

Nov. 22, 1938. S. B. TERRY 2,137,368
CONTINUOUS GAUGE
Filed Aug. 1, 1936 2 Sheets-Sheet 2
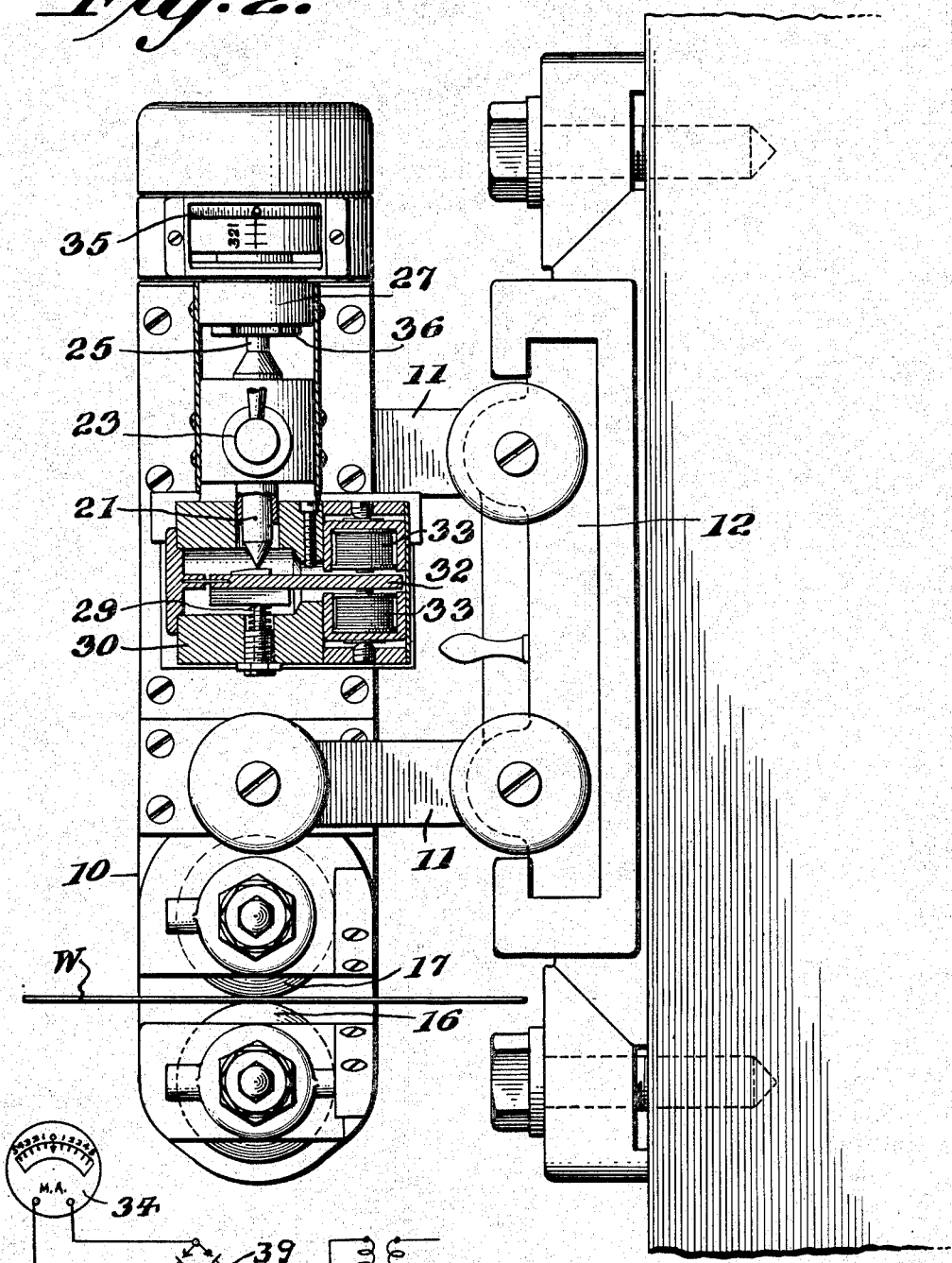
Fig. 2.
Fig. 3.
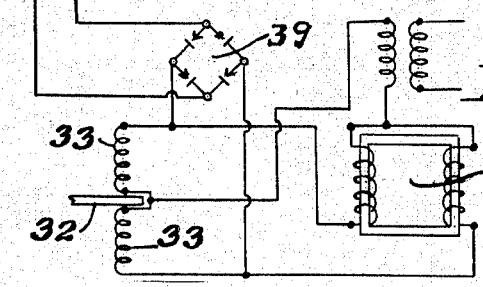
INVENTOR
Spencer B. Terry,
BY
Joseph H. Schofield
ATTORNEY Patented Nov. 22, 1938

2,137,368

UNITED STATES PATENT OFFICE 2,137,368

CONTINUOUS GAUGE

Spencer B. Terry, West Hartford, Conn., assignor to Niles-Bement-Pond Company, Hartford, Conn., a corporation of New Jersey Application August 1, 1936, Serial No. 93,867

5 Claims. (Cl. 33—147)

This invention relates to dimension gauges and particularly to an improved form of work contacting members for a device continuously gauging the thickness of a strip of metal or other material while it is being rolled or otherwise processed and while being rapidly traversed through the gauging members and past the gauge.

An object of the invention is to provide an improved and simplified gauging head including the work contacting members and adjusting means therefor for continuously operating gauging devices similar to that shown and described in the patent to Terry 2,007,840 granted July 9, 1935.

Another object of the invention is to provide an improved setting means for initially adjusting the gauge for various predetermined thicknesses of material and to provide completely self-contained means for that purpose forming a permanent part of the gauge.

With these and other objects in view, the invention may include the features of construction and operation set forth in the following specification and illustrated in the accompanying drawings.

In the accompanying drawings annexed hereto and forming a part of this specification, the invention is shown embodied in a particular form of gauge for gauging all types of metals either magnetic or non-magnetic while being rolled into relatively thin sheets, but it will be understood that the invention can be otherwise embodied and that the drawings are not to be construed as defining or limiting the scope of the invention, the claims appended to this specification being relied upon for that purpose.

In the drawings:

Fig. 2 is a side elevation, partly in section, of the parts shown in Fig. 1, and Fig. 3 is a diagram of the preferred electric circuit which may be employed with the gauge.

Figure 1:
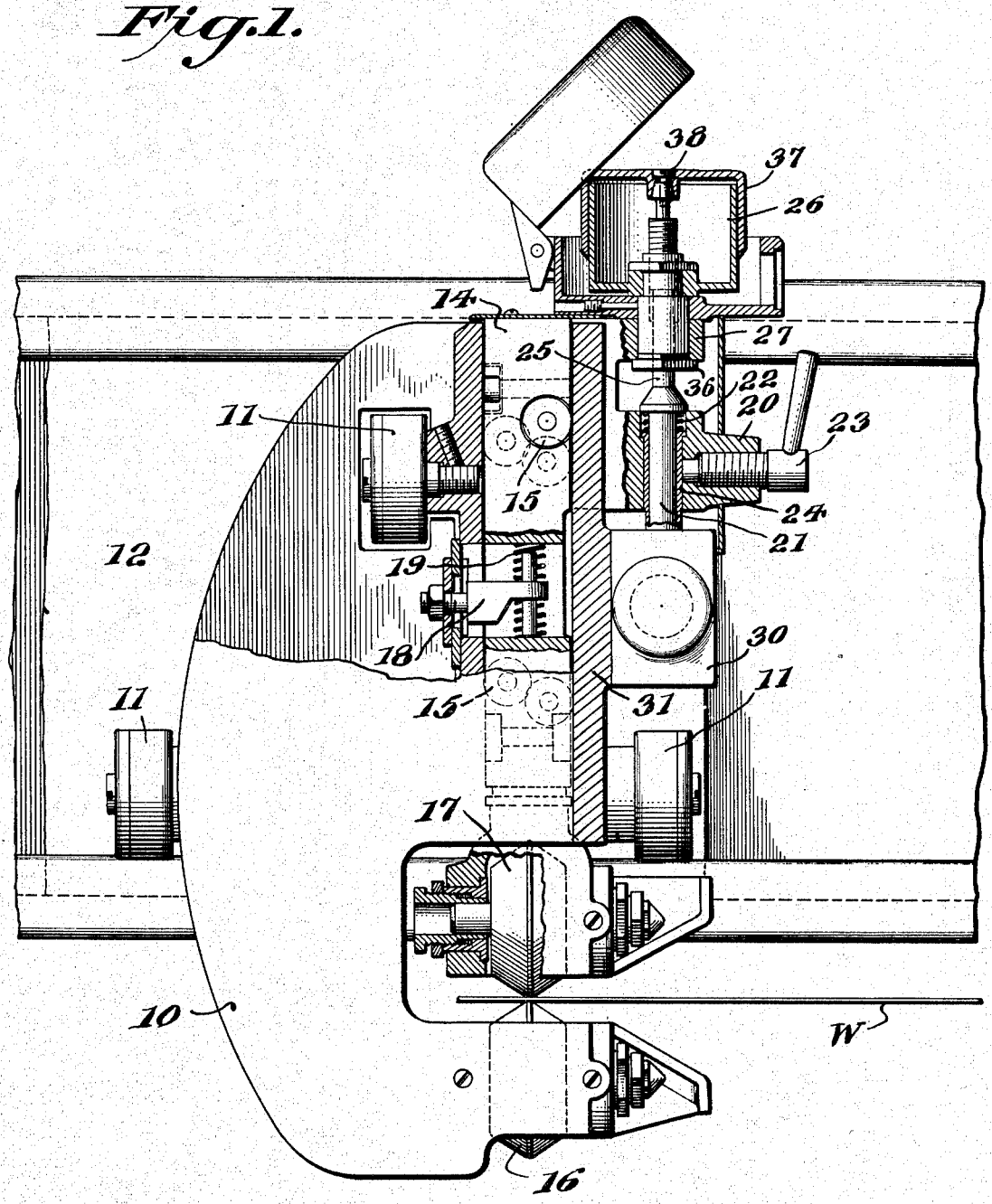
Figure 1 is a front elevation, partly in section, of the complete gauging head shown in position upon its supporting member.

In the above-mentioned drawings there is shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a body member; second, freely swinging parallel arms, each arm being attached pivotally to said member at one end and having their opposite ends attached pivotally to a suitable supporting member so that the body member may be moved in one direction while always maintaining parallel positions; third, a slide movable in said body portion; fourth, freely rotatable rolls mounted in said body portion and slide respectively in directly superposed relation to each other so that they may contact on opposite surfaces of the material being gauged; fifth, a gauge head having an armature therein movable limited distances between opposed induction coils, a rod engaging the armature at one end and adjustably fastened to the slide; sixth, an indicating micrometer on the slide engaging the rod at the opposite end from that in contact with the armature; and seventh, indicating means electrically connected to said coils and indicating varying positions of the armature and the slide carrying the upper roll.

Referring more in detail to the figures of the drawings, there is illustrated a complete gauge having a body portion 10 supported as shown in the figures by means of freely swinging parallelly disposed links 11. One end of each link 11 is suitably and pivotally attached to the gauge head 10 and the opposite end of each link 11 is pivotally attached to a suitable slidable supporting member 12. As the means for supporting the gauge 10 by freely swinging links and the particular form of supporting member 12 form no part of the present invention, it is not thought that further description of these means will be necessary.

Slidably mounted within the body member 10 is a vertically disposed slide 14 suitably supported within guideways formed in the body member. Preferably the slide 14 is provided with anti-friction rollers 15 thereon adapted to contact with the walls of the guideway so that the slide 14 may adjust itself vertically within its guideway with minimum friction.

Rotatably supported within the lower portion of the body member 10 is a roll 16 fixed in position but free to rotate, the axis of rotation being horizontal and normal to the direction of motion of the strip W being gauged as indicated in the drawings. This roll 16, as shown, may have a relatively narrow work engaging periphery and may be supported within suitable bearings provided in the body portion 10 on opposite sides of the roll. Disposed directly above the roll 16 is a second similarly formed roll 17 rotatably mounted on a horizontal axis parallel to the axis of roll 16. This roll 17 is mounted on the lower end of the slide 14 so that raising and lowering of the slide 14 within the body member 10 will vary the distance between the work engaging peripheries of the rolls 16 and 17. To counteract the weight of the slide 14 and also to provide means for varying the pressure of roll 17 against roll 16 there may be provided opposed springs 19 within the slide 14 disposed on opposite sides of a member 18 secured directly to the work support 10 and having pins about which the springs 19 may be retained in place. The adjacent ends of springs 19 bear against opposite surfaces of slide 14 and hold the springs 19 under a light compressive pressure. By means of these springs 19 the pressure of the upper roll 17 mounted in the slide 14 upon the fixed roll 16 in the body member 10 may be adjusted by clamping the member 18 to the body member 10 in slightly different elevated positions. Outstanding from the front face of the slide 14 and preferably formed integral therewith is a short arm or projection 20 in which is disposed a vertical slidably mounted rod member 21 which may be normally pressed vertically upward by means of a light spring 22. Clamping means 23 are provided for this rod 21 engaging the side of a thin sleeve 24 surrounding the rod 21 and enabling the rod 21 to be retained frictionally in any adjusted position for a purpose presently to be described.

Above the rod 21 and with the lower end of its spindle 25 engaging the upper end surface of the rod 21 is an indicating micrometer 26, the body portion of which is retained within another projection 27 formed integrally on the slide 14. By rotating the micrometer spindle 25 in the usual manner to vary its adjustment, the vertical position of the spindle 25 and rod 21 will be varied and its vertical position indicated. The rod 21 thus forms an extension to and moves with the micrometer spindle 25 in a direction directly toward and from the rolls 16 and 17.

Mounted rigidly in fixed position on the body member 10 is a gauge head 30 shown more clearly in Fig. 2. Preferably the gauge head 30 may be directly mounted upon a plate or member 31 secured fixedly to the front face of the body member 10 in a position to enclose the slide 14. Within this gauge head 30 is a flexibly mounted armature 32 forming the dimension indicating means of the gauge, one end of which is free to move vertically as shown. An intermediate portion of this armature 32 contacts with the lower end of the rod 21 referred to above. A light spring 29 mounted within the gauge head 30 presses against and forces the armature 32 upward. The movable end of the armature 32 is disposed between oppositely positioned coils 33 which form a portion of an electric circuit similar to and operating in the same manner as that shown in patent to Terry above referred to.

It will be seen from the above description that with raising and lowering of the slide 14 with the rod 21 clamped in any adjusted position, the position of the armature 32 will be correspondingly varied within its range of movement. This raising and lowering of the slide 14 will be occasioned by variations in thickness of the material W being gauged and this vertical movement of the slide 14 is made use of to determine the thickness of this material to extremely close limits or dimensions. With adjustments of the micrometer 26 to a predetermined dimension, the separation between the rolls 16 and 17 and the thickness of the material will correspond thereto when the armature 32 is disposed centrally between the coils 33. Variations from this position of the armature 32 may be indicated to an extremely high precision by the indicating means including an electric indicating instrument 34 associated within the electric circuit of which the coils 33 form a part.

To initially adjust the gauge so that the micrometer indications 35 will correctly indicate the thickness of the material W being gauged the rolls 16 and 17 are placed in contact with each other and the clamp 23 for rod 21 is released. The vertical position of the micrometer body portion 26 is then fixed rigidly in place by nut 36 and the spindle 25 is raised or lowered as required until the armature 32 is brought to a position in which the electric instrument 34 is at zero. The micrometer thimble 37 is then adjusted by releasing its clamping screw 38 and resetting the thimble so that its zero is in alinement with the reference line on the body member.

With the micrometer thimble 37 and spindle 25 adjusted so that its zero corresponds with the zero position of the roll 17 then each adjusted position of the micrometer will correctly indicate the separation between rolls 16 and 17 for all dimensions.

Preferably the diagram shown in Fig. 3 of the drawings may include a plate rectifier 39 and a transformer 40. As this arrangement of circuits forms no part of the present invention it is not thought that further description will be necessary.

What I claim is:

1. A gauge comprising in combination, a body member, a slide movable within said body member, work contacting members on said body member and slide respectively, an indicating micrometer secured to said slide, a rod forming an extension to the micrometer spindle, and indicating means for the position of said slide, said means including a flexibly mounted armature supported on said body member for limited movement and engaging the opposite end of said rod whereby said armature is moved by movements of said slide, and an electric indicating instrument responsive to movements of said armature.

2. A continuous gauge comprising in combination, a body member, a slide movable within said body member, work contacting rolls on said body member and slide respectively, an indicating micrometer having its body portion secured to said slide, a spindle for said micrometer having an extension, and indicating means for determining the position of said slide, said means including a flexibly mounted armature supported on said body member and engaging the opposite end of said extension.

3. A continuous gauge comprising in combination, a body member, a slide movable within said body member, work contacting rolls on said body member and slide respectively, an indicating micrometer having its body portion secured to said slide, a spindle for said micrometer having an extension, indicating means for determining the position of said slide, said means including a flexibly mounted armature supported on said body member and engaging the opposite end of said extension, and an electric indicating instrument connected and responding to movements of the armature of said indicating means.

4. A continuous gauge comprising in combination, a body member, means to support said body member for free bodily movement in one direction, a slide movable within said body member, work engaging rolls on said body member and slide respectively, an indicating micrometer secured to said slide, a rod adjustable within said slide and contacting at one end with the spindle of said micrometer, and indicating means for the position of said slide, said means including a flexibly mounted armature supported on said body member and engaging the opposite end of said rod, opposed coils on said body member between which said armature is movable, and an indicating instrument responsive to variations in the position of said armature between said coils.

5. A continuous gauge comprising in combination, a body member, means to support said body member for free bodily movement in one direction, a slide movable within said body member, work engaging rolls on said body member and slide respectively, an indicating micrometer secured to said slide, a rod adjustable within said slide and contacting at one end with the spindle of said micrometer, an armature supported on said body member and engaging and moving with said movements of said slide, induction coils disposed on opposite sides of said armature, and indicating means electrically connected to said coils to determine variations in position of said armature and slide.

SPENCER B. TERRY.